United States Patent
Shiga et al.

(10) Patent No.: US 8,327,063 B2
(45) Date of Patent: Dec. 4, 2012

(54) MEMORY SYSTEM WITH A SEMICONDUCTOR MEMORY DEVICE

(75) Inventors: Hitoshi Shiga, Yokohama (JP); Hidetaka Tsuji, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 724 days.

(21) Appl. No.: 12/405,754

(22) Filed: Mar. 17, 2009

(65) Prior Publication Data

US 2009/0292863 A1    Nov. 26, 2009

(30) Foreign Application Priority Data

May 21, 2008 (JP) ................. P2008-133395

(51) Int. Cl.
*G06F 12/00* (2006.01)
(52) U.S. Cl. . 711/103; 711/115; 711/202; 711/E12.001; 711/E12.008
(58) Field of Classification Search ............. 711/103, 711/115, 202, E12.001, E12.008
See application file for complete search history.

(56) References Cited

U.S. PATENT DOCUMENTS

| 7,039,788 B1* | 5/2006 | Chang et al. ............ 711/203 |
| 2008/0155182 A1 | 6/2008 | Kudo |
| 2009/0010057 A1 | 1/2009 | Tsuji et al. |
| 2009/0125699 A1* | 5/2009 | Beadnell et al. ......... 711/173 |

FOREIGN PATENT DOCUMENTS

| JP | 2003-131941 | 5/2003 |
| JP | 2007-517325 | 6/2007 |

OTHER PUBLICATIONS

U.S. Appl. No. 12/557,898, filed Sep. 11, 2009, Shiga.
Notification of Reason(s) for Refusal mailed Sep. 4, 2012, in Japanese Patent Application No. 2008-133395 filed May 21, 2008, (with English Translation).

* cited by examiner

*Primary Examiner* — Jasmine Song
(74) *Attorney, Agent, or Firm* — Oblon, Spivak, McClelland, Maier & Neustadt, L.L.P.

(57) ABSTRACT

A memory system with a semiconductor memory device, in which a physical block of n-bits serves as an erase unit, wherein the address management of the memory device is performed by a logical block with m-bits, "m" being larger than "n" and expressed by a power of two, and wherein a n-bit portion continued from the head address in the logical block is defined as a first management unit corresponding to one physical block of the memory device, and a number of the remaining fraction portions each defined as a second management unit are gathered so as to correspond to one physical block of the memory device.

14 Claims, 13 Drawing Sheets

MEMORY SYSTEM WITH A SEMICONDUCTOR MEMORY DEVICE

CROSS-REFERENCE TO RELATED APPLICATION

This application is based on and claims the benefit of priority from the prior Japanese Patent Application No. 2008-133395, filed on May 21, 2008, the entire contents of which are incorporated herein by reference.

BACKGROUND OF THE INVENTION

1. Field of the Invention

This invention relates to a memory system with a semiconductor memory device, specifically to an address management method of a flash memory storing eight value data.

2. Description of the Related Art

A NAND-type flash memory is known as an electrically rewritable and non-volatile semiconductor memory device (EEPROM). Recently, as the integration and capacity of the NAND-type flash memory increase, there is a great demand for recording moving image and the like in a video camera, a portable phone and the like.

As well known, the NAND-type flash memory may be erased only by an erase unit defined by a block. Conventionally, in a control system with a NAND-type flash memory, one or some physical blocks are defined as a logical block, and logic addresses are corresponded to the physical addresses.

To sequentially store moving images in a large logical space, it is usually used in a host device an allocation unit AU of, for example 4MByte, as a logical block unit. Conventionally, AU is defined by a capacity expressed by a power of two in consideration of its controllability.

In case a binary data storage scheme defined by 1-bit/cell or a four value data storage scheme defined by 2-bits/cell is used in the NAND-type flash memory, the physical block size serving as an erase unit may be expressed by a power of two (for example, refer to JP-A-2006-178923). However, in case an eight value data storage scheme defined by 3-bits/cell, the physical block size may not be expressed by a power of two, so that the logical block size in the host device is mismatched with the physical block size.

As a result, to continuously record moving images and the like, there are often generated copying operations in the flash memory, and it leads to reduction of the write performance.

SUMMARY OF THE INVENTION

According to an aspect of the present invention, there is provided a memory system with a semiconductor memory device, in which a physical block of n-bits serves as an erase unit, wherein the address management of the memory device is performed by a logical block with m-bits, "m" being larger than "n" and expressed by a power of two, and wherein an n-bit portion continued from the head address in the logical block is defined as a first management unit corresponding to one physical block of the memory device, and a number of the remaining fraction portions each defined as a second management unit are gathered so as to correspond to one physical block of the memory device.

According to another aspect of the present invention, there is provided a method of controlling a semiconductor memory device, in which a physical block of n-bits serves as an erase unit, wherein the address management of the memory device is performed by a logical block with m-bits, "m" being larger than "n" and expressed by a power of two, and wherein an n-bit portion continued from the head address in the logical block is defined as a first management unit corresponding to one physical block of the memory device, and a number of the remaining fraction portions each defined as a second management unit are gathered so as to correspond to one physical block of the memory device.

DETAILED DESCRIPTION OF THE EMBODIMENTS

Illustrative embodiments of this invention will be explained with reference to the accompanying drawings below.

Figure 1:
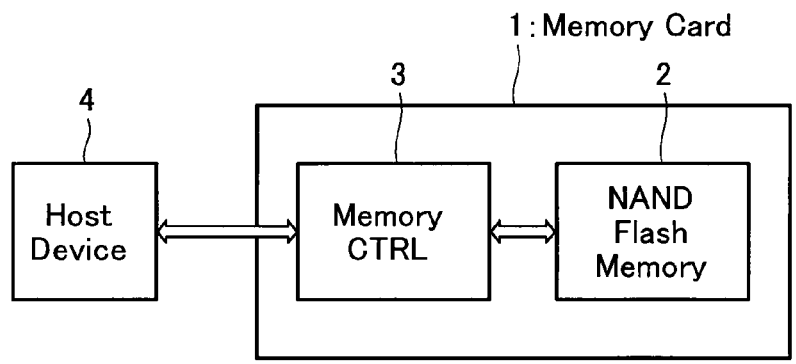
FIG. 1 shows a memory controlling system with a NAND-type flash memory in accordance with an embodiment of the present invention.

FIG. 1 shows a NAND-type flash memory system. A NAND-type flash memory 2 and a memory controller 3 are integrally mounted to constitute a memory card 1. Host device 4 is, for example, a mobile device such as a video camera. It is assumed here that the memory card 1 is attached to the host device 4, and moving picture and the like are recorded therein.

Figure 2:
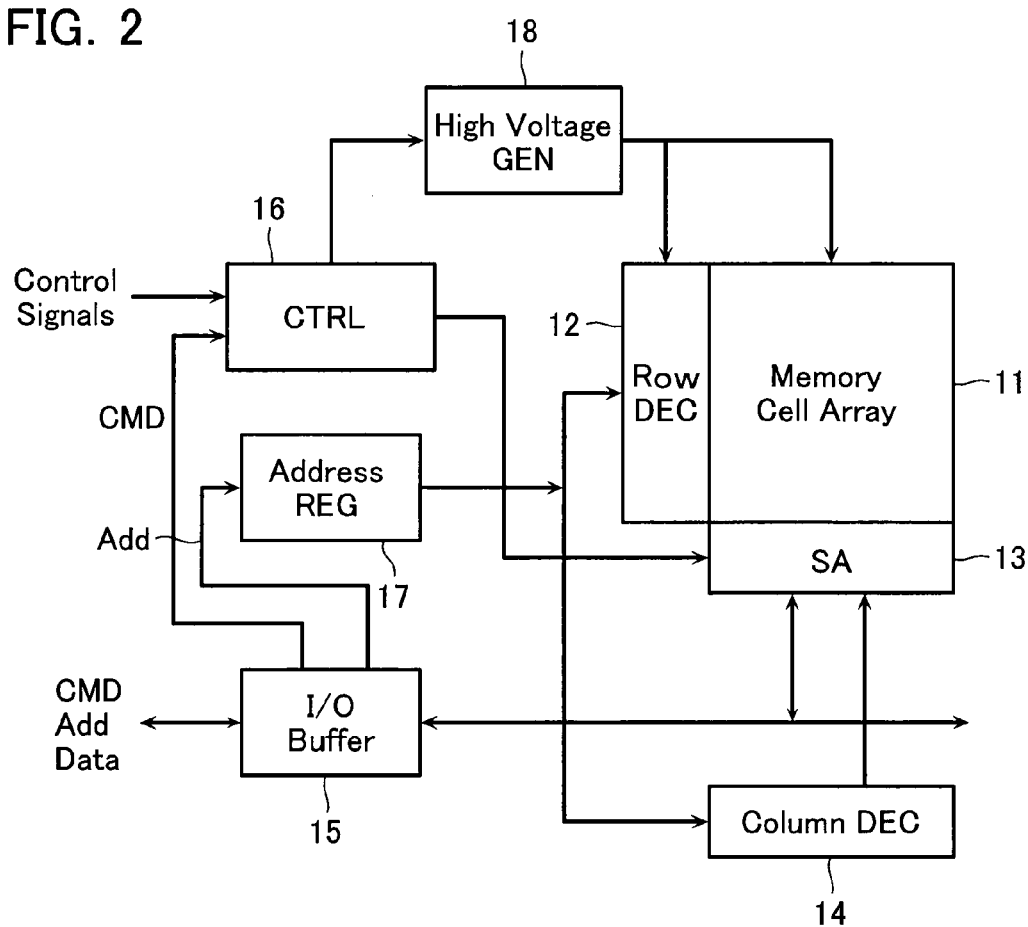
FIG. 2 shows a functional block configuration of the NAND-type flash memory.
Figure 3:
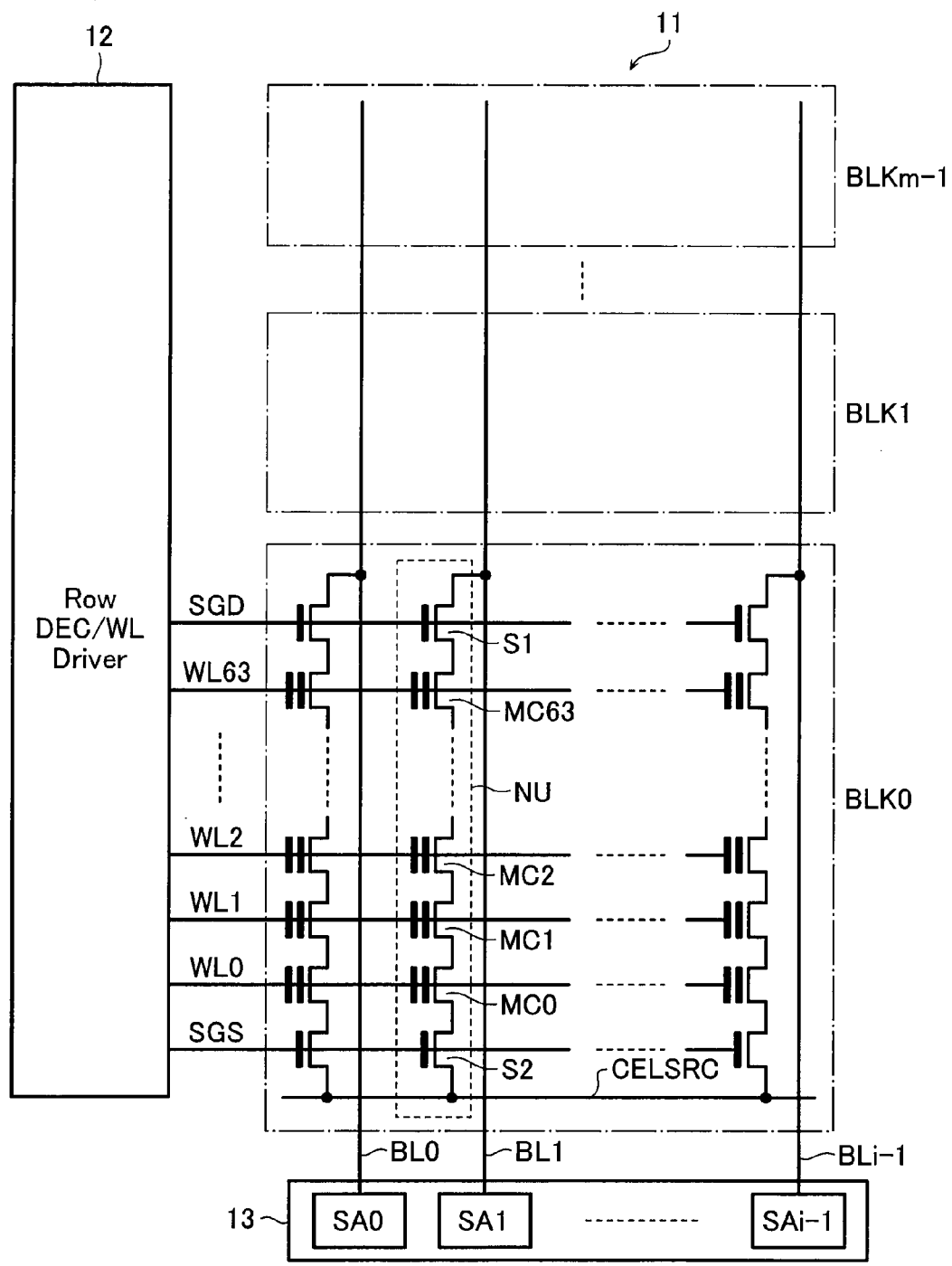
FIG. 3 shows a memory cell array of the flash memory.

FIG. 2 shows the configuration of the NAND-type flash memory 2. Memory cell array 11 is, as shown in FIG. 3, formed of NAND cell strings, NU, arranged therein, each of which has a plurality of electrically rewritable and non-volatile memory cells MC0-MC63 connected in series. One end of the NAND string NU is coupled to a bit line BL via select gate transistor S1 while the other end is coupled to a common source line CELSRC via select gate transistor S2.

Control gates of the memory cells MC0-MC63 are coupled to word lines WL0-WL63, respectively; and gates of select gate transistors S1 and S2 to select gate lines SGD and SGS, respectively.

A set of NAND strings sharing word lines constitutes a physical block serving as an erase unit. As shown in FIG. 3, multiple blocks BLK0-BLKm-1 are arranged in the bit line direction.

There are prepared a row decoder 12 for selectively driving word lines and select gate lines, and a sense amplifier circuit 13 selectively coupled to bit lines for sensing data or controlling bit lines in accordance with stored write data.

Sense amplifier circuit 13 contains sense amplifiers SA corresponding to the respective bit lines. That is, a set of memory cells selected by a word line serves as a physical page, and sense amplifier circuit 13 serves for reading and writing data by a page.

One page read data read in the sense amplifier circuit 13 is transferred to data line by a column selected with column decoder 14, and output to I/O pads via I/O buffer 15. One page write data is also input by a column to be loaded in the sense amplifier circuit 13.

Command CMD and address Add are taken into internal controller 16 and address register 17, respectively. Internal controller 16 decodes the command CMD, and executes read, write and erase sequences in accordance with the command instructions and external control signals. Address Add is sent to row decoder 12 and column decoder 14 via address register 17.

To generate high voltages required in the read, write and erase modes, there is prepared a high voltage generating circuit 18, which is controlled by the internal controller 16.

Figure 4:
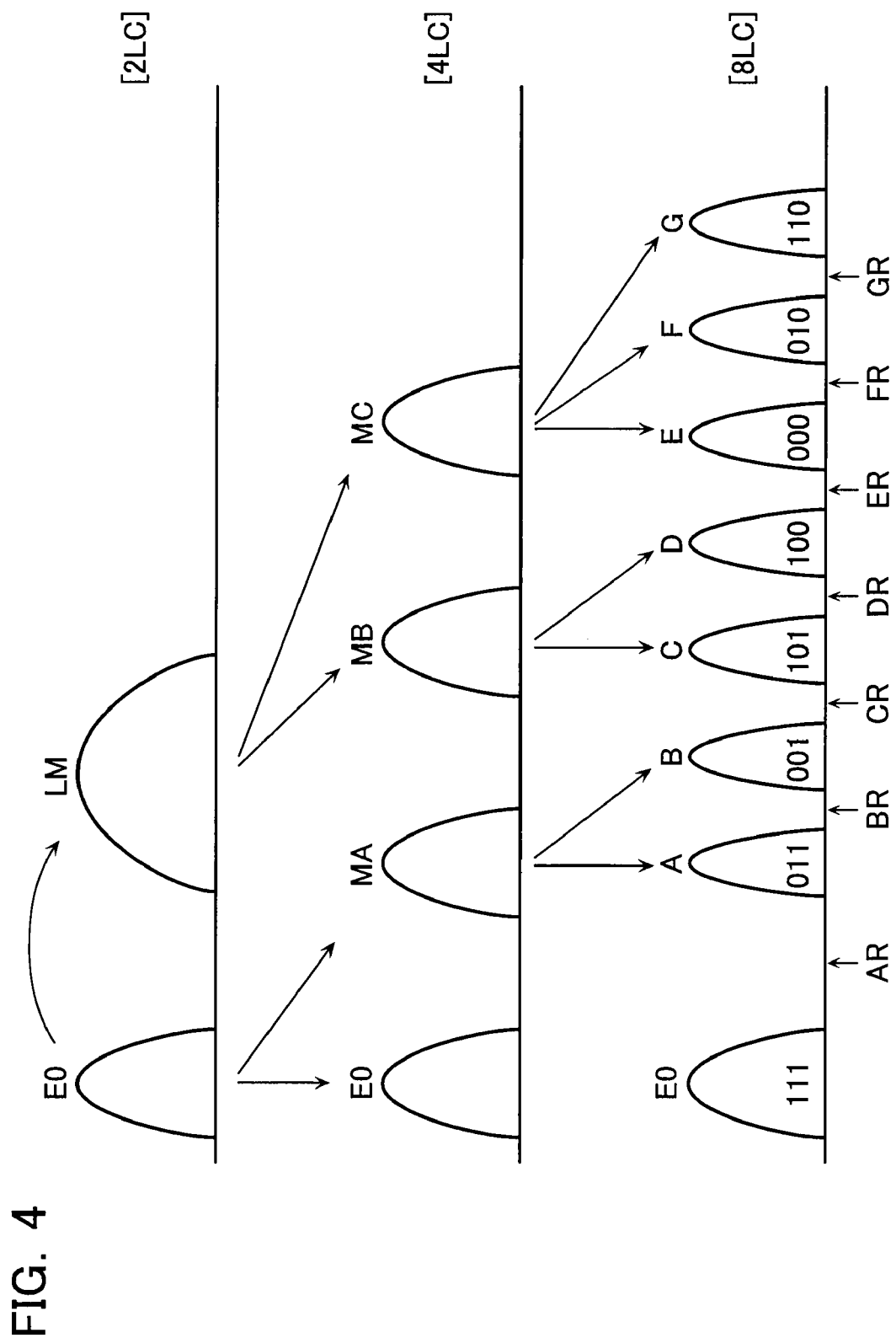
FIG. 4 shows a data threshold distribution of an eight level data storage scheme of the flash memory.

It is assumed in this embodiment that NAND-type flash memory 2 stores eight-level data, for example, as shown in FIG. 4. In the example shown in FIG. 4, it is shown that threshold levels E0, A-G defining the eight-level data are written by three write steps of: lower page write for obtaining two data levels (2LC); medium page write for obtaining four data levels (4LC); and upper page write for obtaining eight data levels (8LC).

In the lower page write step, a certain positive threshold level LM is written from erased state level (negative threshold level) E0. In the medium page write step, cells in level E0 are selectively written into level MA; and cells in level LM are selectively written into levels MB or MC. In the upper page write step, cells in level MA are changed to level A or B; cells in level MB to level C or D; and cells in level MC to level E, F or G.

As a result, it is assumed that eight level data is expressed by (UP, MP, LP) (where, UP is upper page bit; MP medium page bit; and LP lower page bit), eight level data will be obtained as being defined as follows: E0=(1,1,1), A=(0,1,1), B=(0,0,1), C=(1,0,1), D=(1,0,0), E=(0,0,0), F=(0,1,0) and G=(1,1,0).

It should be noted that the bit assignment of eight level data and the write method are mere examples, and the present invention is not limited to it.

[Problem to Be Solved]

It will be explained below such a problem to be solved in the above-described flash memory system that the logical block in the host device is mismatched with the physical block in the flash memory because it stores eight level data.

For example, it is assumed such a case that physical block (erase block) BLKi explained in FIG. 3 contains 64 word lines and 32 k+α bit lines. Here, "α" is an additional column such as ECC column used for error-detecting and correcting, management column and the like. In this case, the block size, which is used for storing data written in the memory card 1 from host device 4, is 64×32 bit=256 kB in case of two level data storage, or 512 kB in case of four level data storage, or 768 kB in case of eight level data storage.

Figure 5:
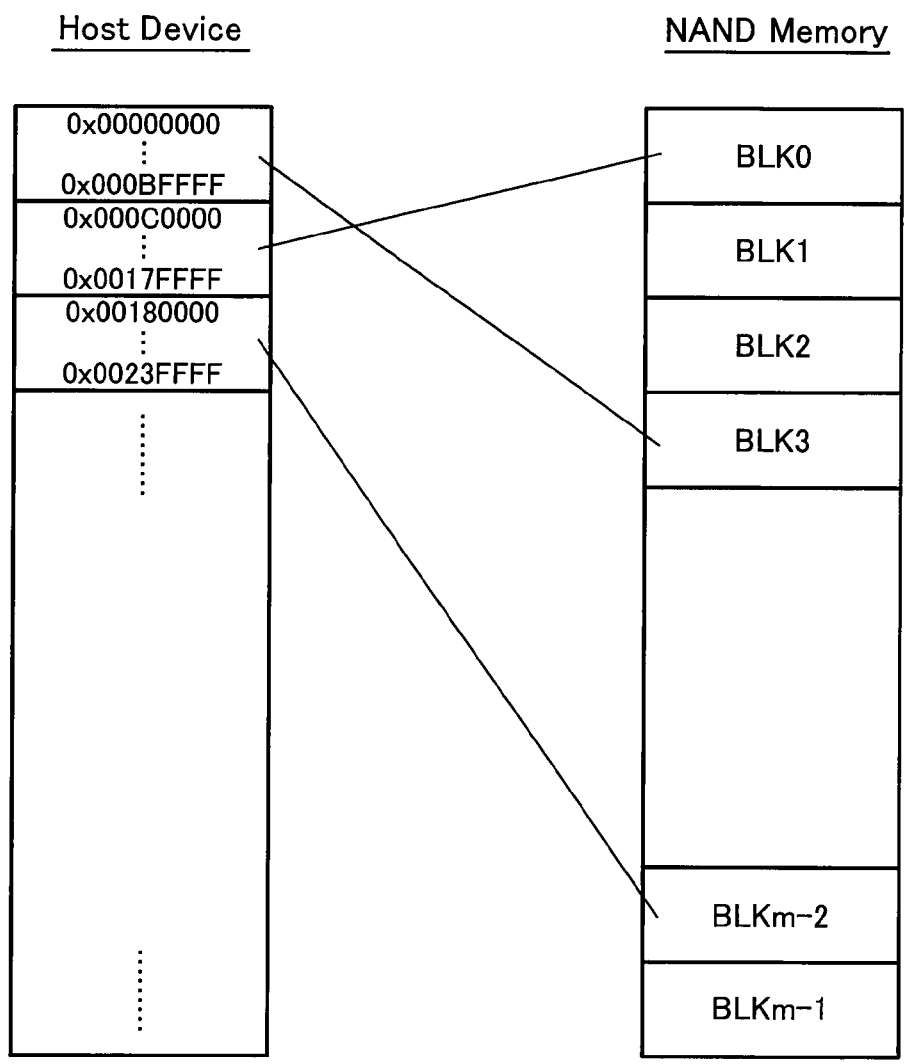
FIG. 5 shows an example of logical/physical address correspondence between the host device and the flash memory.

In a conventional control system with a usual NAND-type flash memory, one or more physical blocks serve as a unit, with which "logical address" and "physical address" are corresponded to each other, and the unit is referred to as a "logical block". In the control system with the above-described eight level data storage scheme, assuming that one physical block serves as a minimum unit, the logical block size is 768 kB. Therefore, logical address in the host device and physical address in the flash memory are corresponded to each other as shown in FIG. 5.

Host device does not manage directly the physical address of the flash memory. That is, there is prepared a logical address/physical address conversion table in the memory controller 3, which is rewritten every data renewal time, so that the host device accesses the flash memory with only logical address.

In a data storage system with the above-described NAND-type flash memory, a FAT file system is used in a general way. Therefore, if a file data becomes unnecessary, FAT thereof is cleared without erasing the file data, and a new file data is, if necessary, over-written in the data area. In such the memory control system, it is not performed generally to judge whether the written data is effective or not by looking in the FAT data.

In the memory control system with the above-described NAND-type flash memory, copying operations often become necessary due to the mismatch between the logical block size in the host device and the physical block size in the memory. Such the copying operation will forcedly make the host device wait for data transferring. If the waiting time is not absorbed in a buffer in the host device, it becomes necessary to suspend the recording operation of the moving image and the like.

Figure 6:
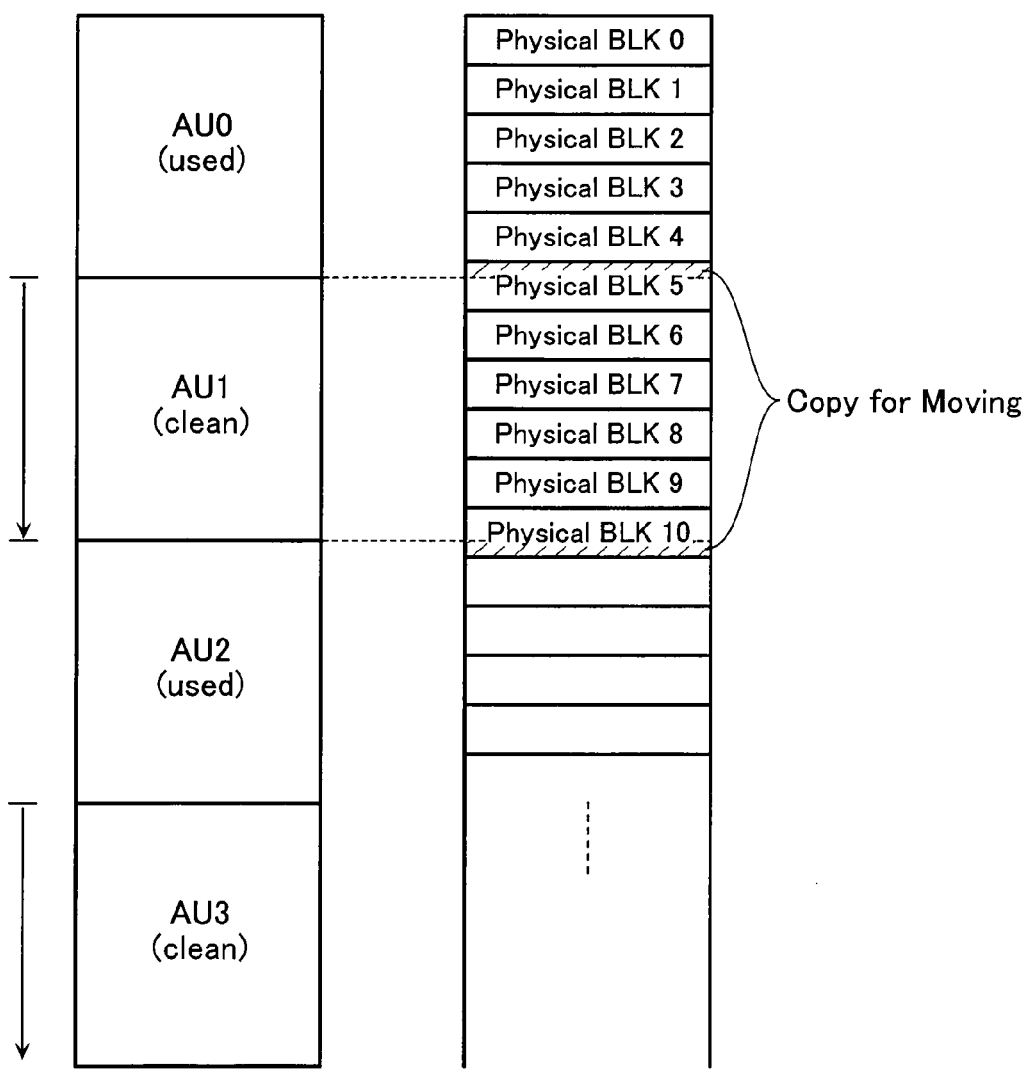
FIG. 6 shows a copying operation due to mismatch between the logic block size of the host device and the physical block size of the flash memory.

FIG. 6 shows a moving image recording situation, in such a case that a flash memory with an eight level data storage scheme has physical blocks each size being 768Byte while a host device has allocation units, AU, each size being 4MB, and the host device is going to sequentially record moving pictures into unused (clean) allocation units AU1 and AU3, avoiding the used allocation units AU0 and AU2. In this case, if physical blocks 5 and 10 include data in the used AU area, it becomes necessary to copy the effective data (expressed as slant line areas) in these blocks 5 and 10) to move them into other areas. That is, to write data into AU1, it is in need of erasing the blocks 5 and 10, and to prevent the effective data in the blocks 5 and 10 from being erased, it is in need of copying for moving them.

If the buffer size in the host device or the write performance of the NAND-type flash memory is insufficient, there is a possibility that the continuous moving image recording become impossible due to the above-described copying operation. In a NAND-type memory control system, in which such a logical/physical address correspondence is used that has a unit not expressed by a power of two, it becomes necessary in practice to secure allocation units with continuous addresses required for storing a moving image with a certain size. However, such the method brings a limitation to users, and it spoils the convenience.

Figure 7:
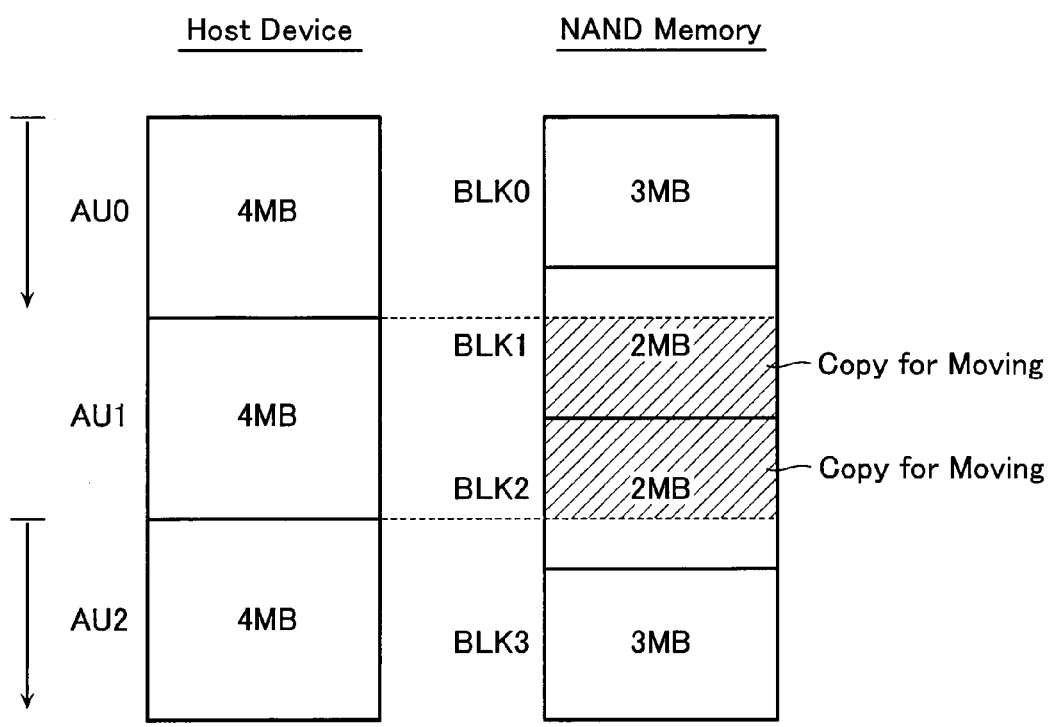
FIG. 7 shows a worse case necessary for a similar copying operation.

FIG. 7 shows a worse case, in which the flash memory with an eight level data storage scheme has a physical block size of 3M and the logical block size of the allocation unit in the host device is 4MB. In this case, although three allocation units AU correspond to four physical blocks with the same capacity as each other, one allocation unit is always extended over two physical blocks in the NAND-type flash memory.

As shown in FIG. 7, assuming that initially data is written in allocation unit AU0, and then write data is written in allocation unit AU2 at the interval of two allocation units. To write the first allocation unit AU0, it is necessary to read 2MB data (expressed as a slant line area) in the second physical block BLK1 for copying and caching it. Similarly, to write the third allocation unit AU2, it is necessary to read 2MB data (expressed as a slant line area) in the physical block BLK2 for copying and caching it. Explaining in other words, to write two allocation units, it is generated a copying operation for copying 4MB data.

By contrast, suppose that the physical block size of the eight level data storing NAND-type flash memory is 768 kB and the logical block size is set to be 256 kB, i.e, one to three. In this case, the access unit is 256 kB defined as a power of two, so that it becomes unnecessary to copy the fractional data.

However, since the erase unit is 768 kB, it becomes necessary for securing a clean area to perform such garbage collection or consolidation as to collect garbage, i.e., unnecessary data remained area, anywhere. Therefore, as a result, a copy operation will be generated during the moving image recording.

Figure 8:
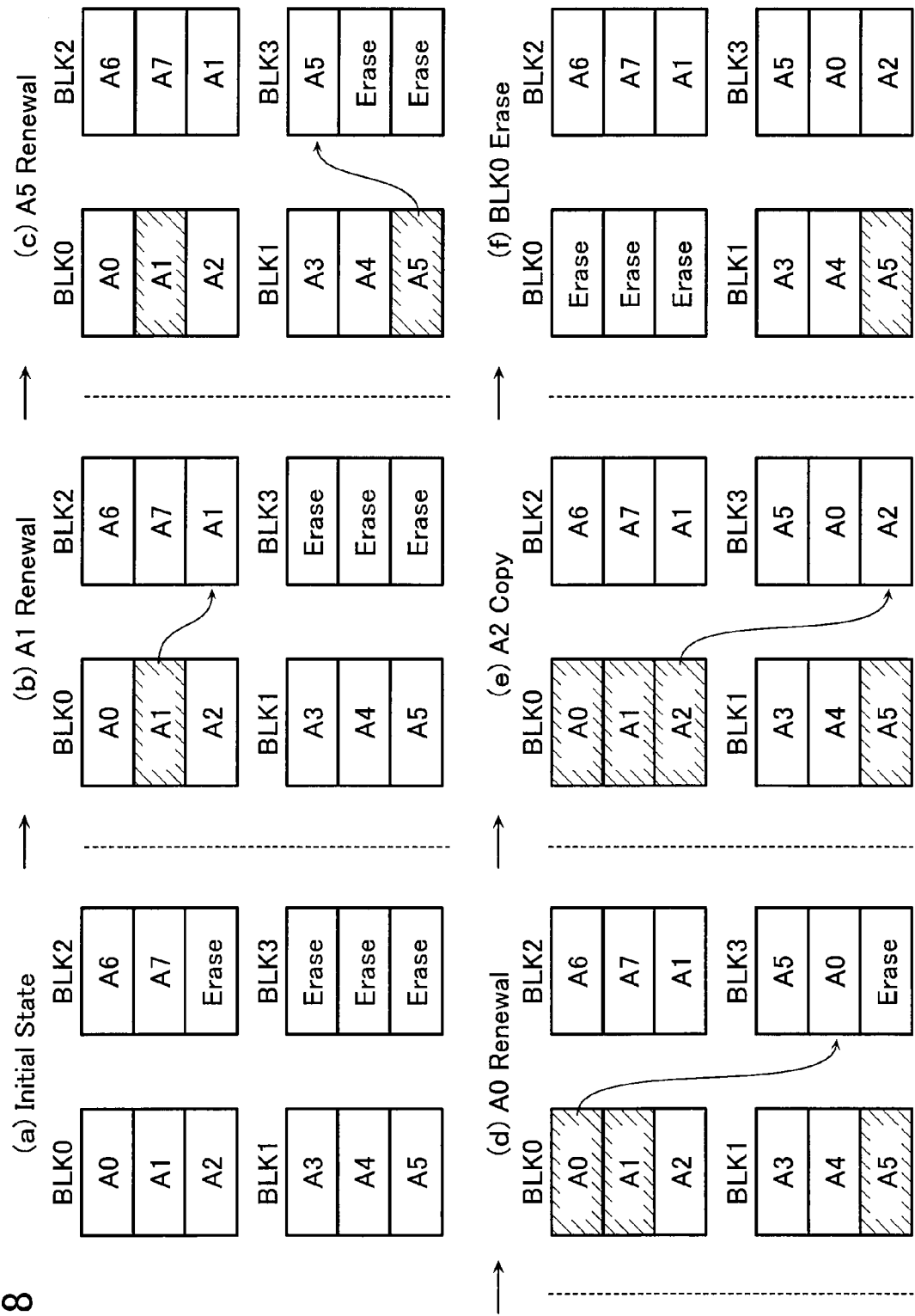
FIG. 8 shows a copying operation for garbage collection.

The situation of garbage collection will be explained with reference to FIG. 8. This example is such a simplified model that NAND-type flash memory has four physical blocks BLK0-BLK3 each being 768 kB while the logical block size is one to three of the physical blocks, and eight logical blocks A0-A7 are assigned in this memory.

In this case, if random write operations are generated, effective data are dispersedly written in the physical blocks in the memory, and erased physical blocks become fewer gradually, thereby resulting in that there is no erased block. To avoid such the situation, it becomes necessary to perform such garbage collection as to copy the effective data in a block with a small effective area to another physical block, which has been, and erase the copy-source physical block.

The detail will be explained as follows. In the initial state (a), data of logical blocks A0-A7 are written into the physical blocks BLK0 and BLK1, in which data filled entirely, and two to three of the physical block BLK2. In the A1 data renewal state (b), the A1 data is, for example, written into the ⅓ space area of physical block BLK2. Similarly, in the A5 data renewal state (c), the A5 data is written into the physical block BLK3. Further, in the A0 data renewal state (d), the A0 data is written into the physical block BLK3.

As a result of the above-described data renewal operations, old data A0, A1 and A5 (shown as slant line areas become unnecessary data (i.e., garbage). At this stage, since the remaining capacity of the memory has been lessened, garbage collection will be performed. That is, as a copy operation (e), read the effective data (A2 data) in the block BLK0, and write it into the remaining space of the block BLK3. As a result, the entire data in the block BLK0 becomes unnecessary. Therefore, erase the block BLK0 in the erase step (f).

As explained above, it becomes possible to rearrange the effective data in the NAND-type flash memory and secure an effective space area. However, this garbage collection is a kind of internal copying operations executed in the memory, so that it spoils the write performance of the host device.

[Embodying Mode]

Figure 9:
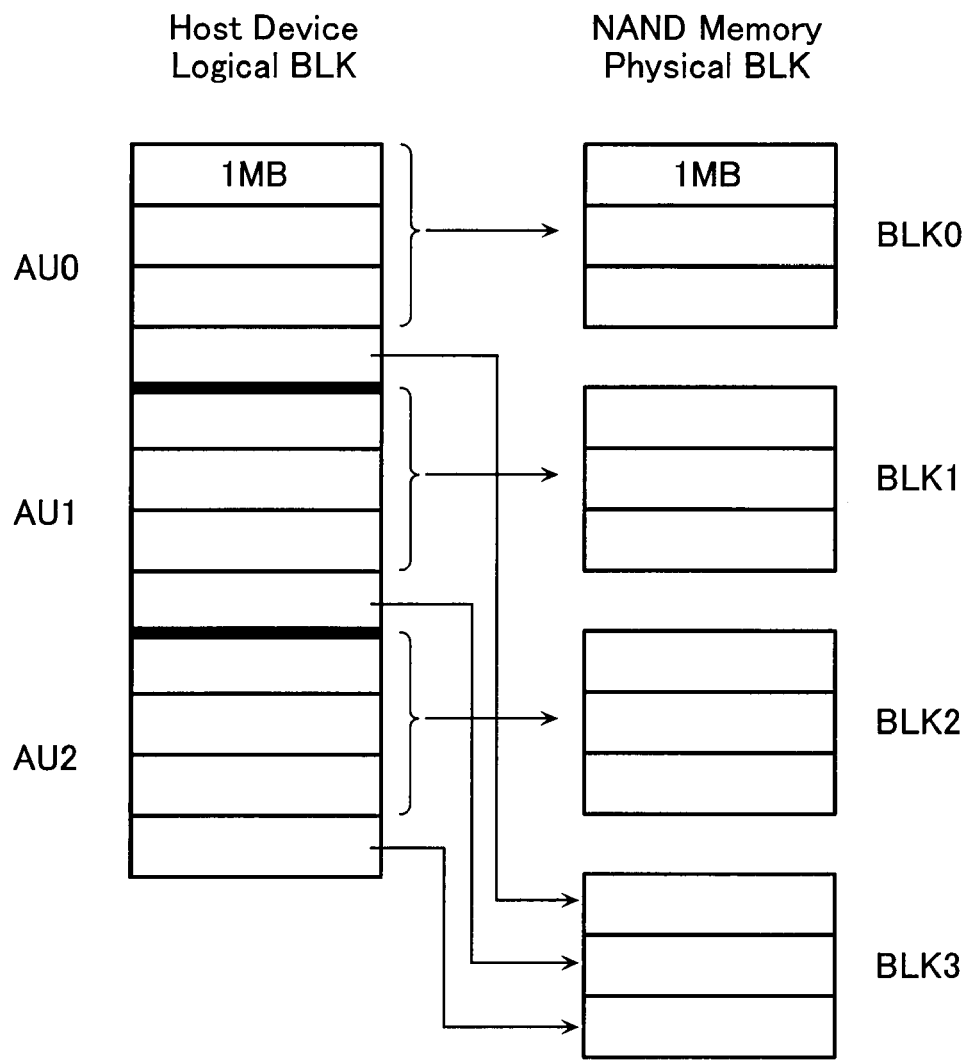
FIG. 9 shows the logical/physical address correspondence in accordance with an embodiment.

FIG. 9 shows the logical/physical address correspondence in this embodiment, which is able to solve the above-described problems. In case the eight level data storing NAND-type flash memory has a physical block BLKi of 3 MB while allocation unit AUi of 4 MB is set in the host device as a logical block, AUi is divided into four units, each of which is 1 MB.

A 3 MB portion continued from the head address in each of allocation units AU0-AU2 is defined as a "first management unit". These three first management units selected from allocation units AU0-AU2 are assigned to the physical blocks BLK0-BLK2, respectively, in the memory device. The remaining fraction portions in the three allocation units, each of which is defined as a "second management unit" of 1MB, are gathered to be assigned to another physical block BLK3 in the memory device.

According to this address management, it appears that there is no mismatch between allocation unit AUi and physical block BLKi. Further, even if a write operation performed by AU jumps, garbage collection will be performed with only copying operation of 2 MB.

Figure 10:
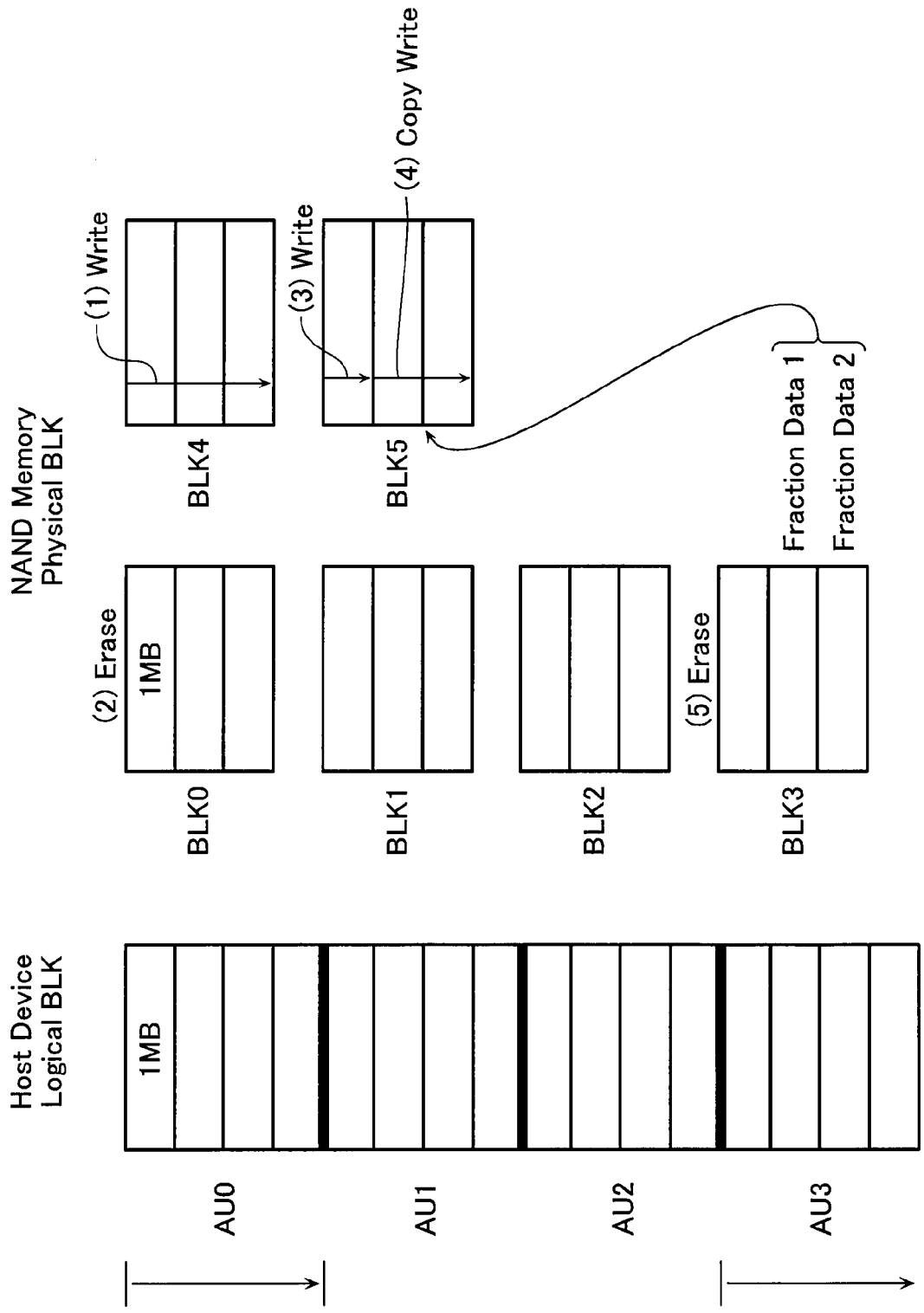
FIG. 10 shows a write example with a logical block jumping.

For example, FIG. 10 shows such a case that a renewal write operation jumps from the first allocation unit AU0 to the fourth allocation unit AU3. It is assumed here that there are effective data in AU0-AU2, which are written into blocks BLK0-BLK3 in accordance with the physical/logical address correspondence explained in FIG. 9.

With respect to 3MB continued from the head address within the renewal data in the initial allocation unit AU0, i.e., first management unit, it will be dealt with as follows: (1) An erased block BLK4 is prepared, and the above described 3 MB is written into it. (2) Block BLK0 stored with the old data is erased. (3) The remaining data of 1 MB constituting a second management unit is written in a new prepared and erased block BLK5.

At this stage, fraction data 1 and 2 in the second and third allocation units AU1 and AU2, respectively, are stored in block BLK3 as useful or effective data. Although there is remaining in BLK3 another fraction data of the first allocation unit AU0, this is unnecessary or useless data because it has already been renewed and written in block BLK5. Therefore, prior to the write operation for the fourth allocation unit AU3, garbage collection will be performed as follows.

(4) The effective fraction data 1 and 2 remaining in block BLK3 are copied and written in block BLK5, in which the renewed fraction data of AU0 has been written. At this stage, it is necessary to copy 2MB data. Finally, (5) garbage block BLK3 is erased.

Data write of the fourth allocation unit AU3 is performed as follows: 3 MB data is written in block BLK3, which has become clean as a result of the above-described garbage collection; and 1 MB fraction data is written into another clean block.

Figure 11:
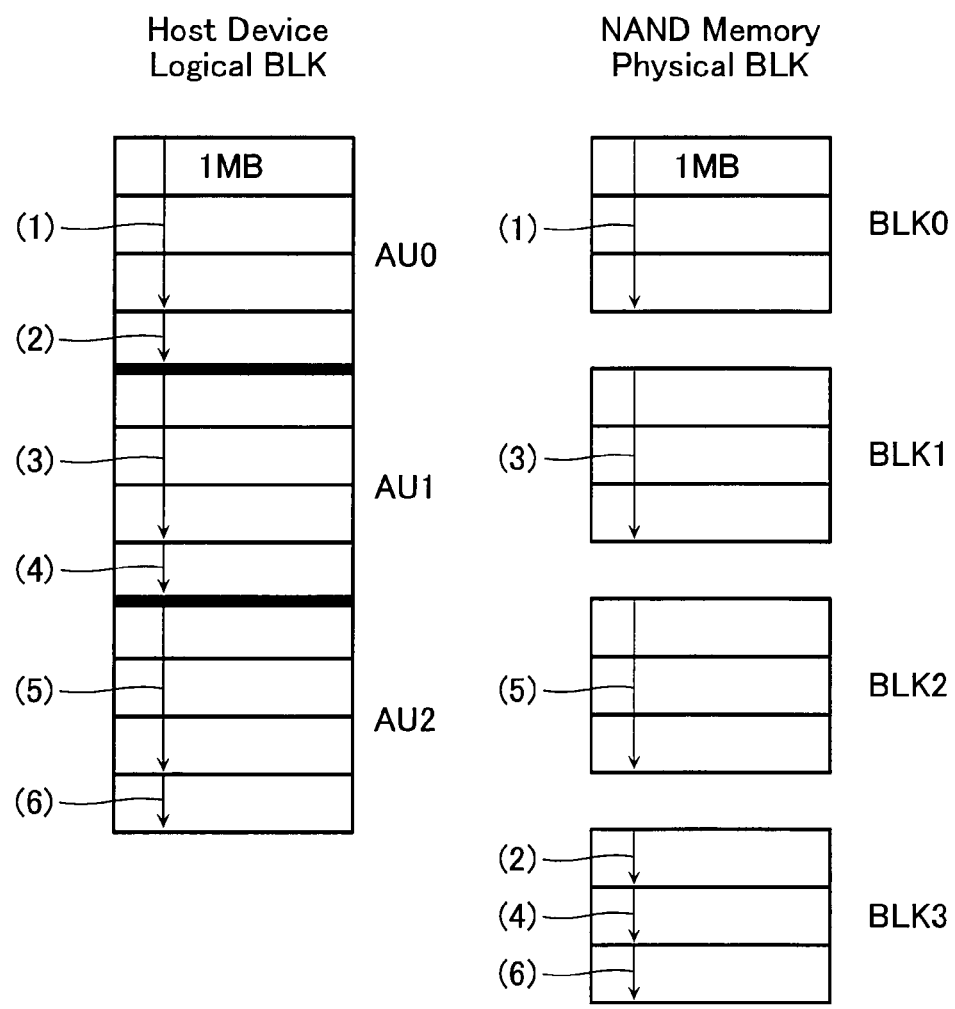
FIG. 11 shows an example of sequential data write.

FIG. 11 shows such a case that renewal write operations are continuously performed in order from the initial unit AU0. Assuming in this case that physical blocks BLK0-BLK2 in the flash memory are cleared, the renewal write operation are as follows: (1) write the head portion 3MB within renewal write data in AU0 into block BLK0; (2) write fraction data 1 MB thereof into block BLK3; (3) write the head portion 3 MB within renewal write data in AU1 into block BLK1; (4) write fraction data 1 MB thereof into block BLK3; (5) write the head portion 3 MB within renewal write data in AU2 into block BLK2; and (6) write fraction data 1 MB thereof into block BLK3.

After continuously writing data as described above, erase the NAND physical blocks, in which old data in AU0-AU2 are written, and there is not generated a copying operation.

That is, in case of the above-described continuous write, overhead is not generated due to copying, and the write performance is kept at the maximum level.

In the above-described embodiment, it is assumed that the physical block size of the flash memory is 3 MB while the logical block size in the host device is 4 MB. The embodiment will be generalized as follows: a memory system with a semiconductor memory device, in which an erase unit is defined by a physical block with n-bits, wherein the address management of the memory device is performed by a logic block unit with m-bits, "m" being expressed by a power of two larger than the capacity of the physical block, and wherein a portion of n-bits continued from the head address is defined as a first management unit corresponding to one physical block of the memory device, and remaining fraction portions serving as second management units are gathered so as to correspond to one physical block of the memory device.

[Application Devices]

As an embodiment, an electric card using the non-volatile semiconductor memory devices according to the above-described embodiment of the present invention and an electric device using the card will be described bellow.

Figure 12:
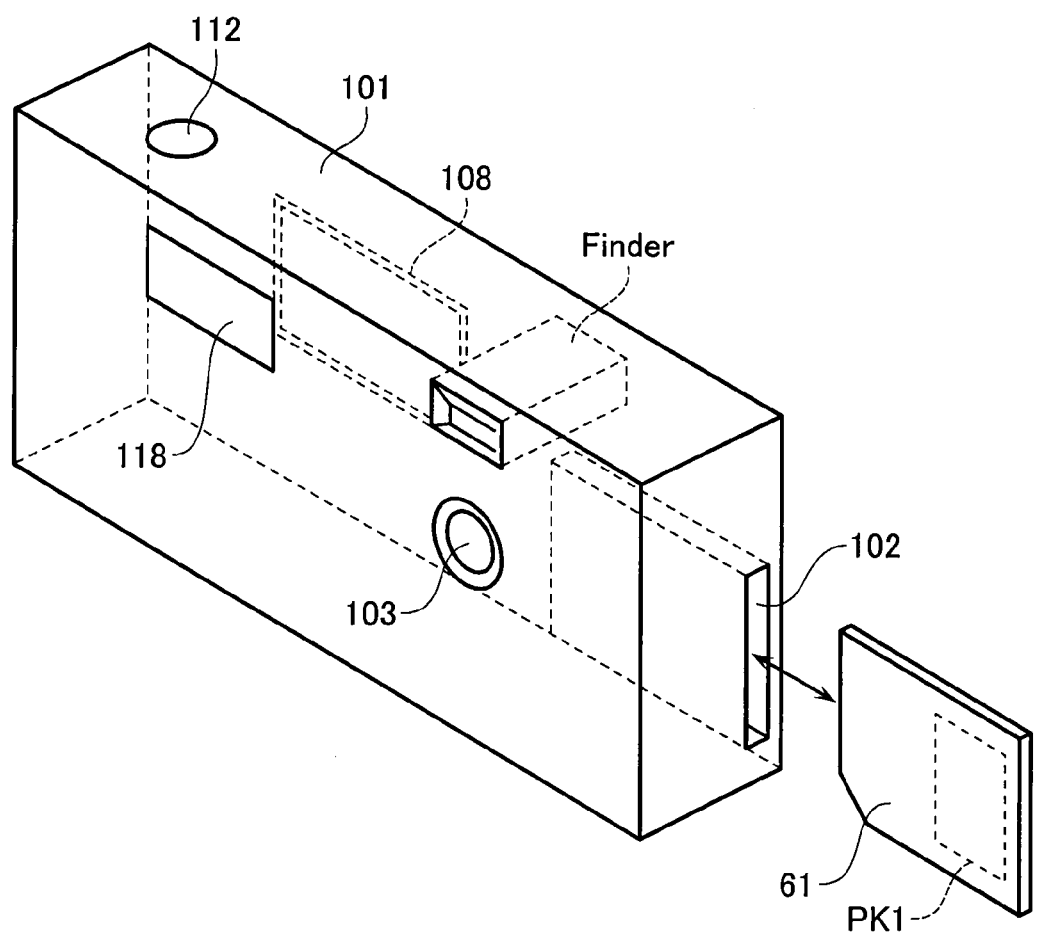
FIG. 12 shows another embodiment applied to a digital still camera.

FIG. 12 shows an electric card according to this embodiment and an arrangement of an electric device using this card. This electric device is a digital still camera 101 as an example of portable electric devices. The electric card is a memory card 61 used as a recording medium of the digital still camera 101. The memory card 61 incorporates an IC package PK1 in which the non-volatile semiconductor memory device or the memory system according to the above-described embodiments is integrated or encapsulated.

The case of the digital still camera 101 accommodates a card slot 102 and a circuit board (not shown) connected to this card slot 102. The memory card 61 is detachably inserted in the card slot 102 of the digital still camera 101. When inserted in the slot 102, the memory card 61 is electrically connected to electric circuits of the circuit board.

If this electric card is a non-contact type IC card, it is electrically connected to the electric circuits on the circuit board by radio signals when inserted in or approached to the card slot 102.

Figure 13:
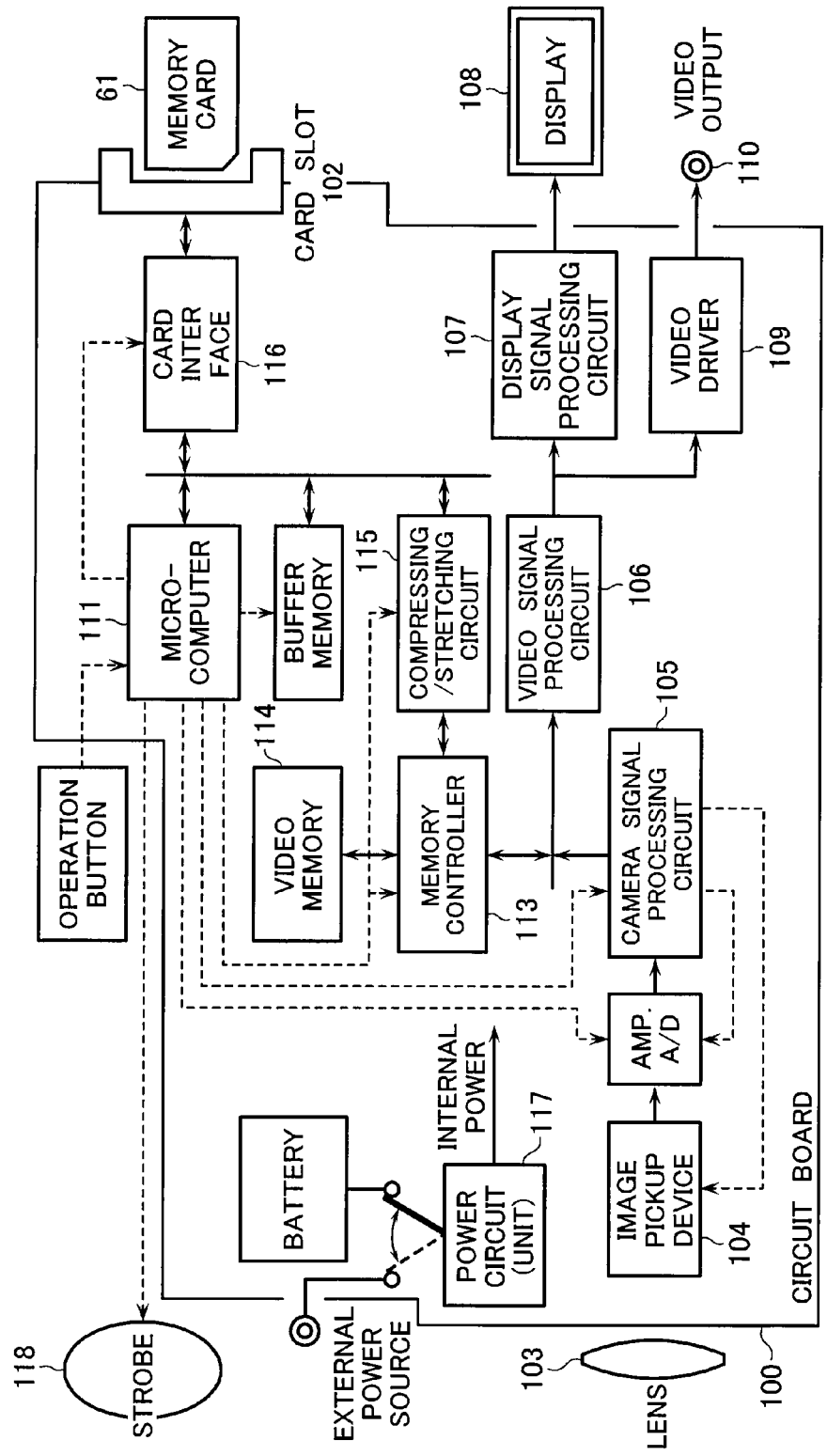
FIG. 13 shows the internal configuration of the digital still camera.
Figure 14A:
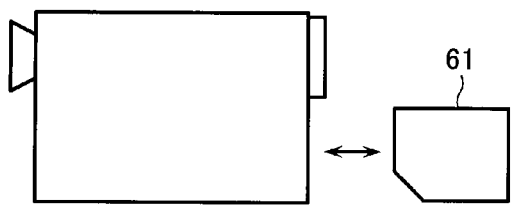
FIGS. 14A to 14J show other electric devices to which the embodiment is applied.
Figure 14F:
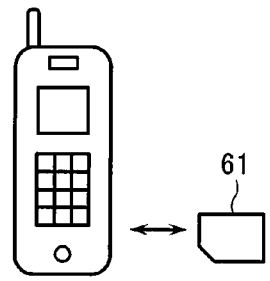
Figure 14B:
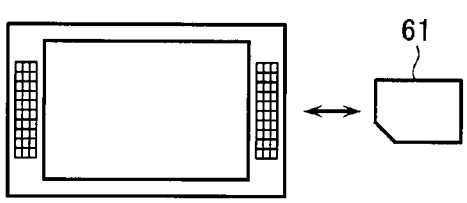
Figure 14G:
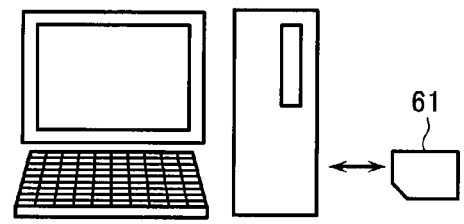
Figure 14C:
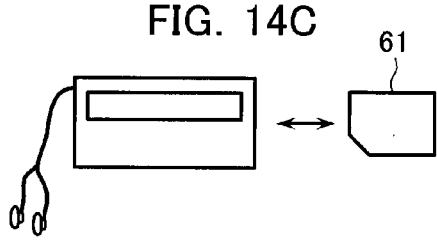
Figure 14H:
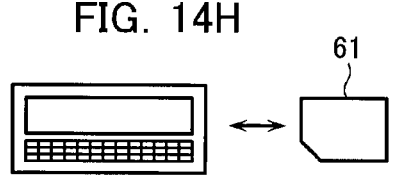
Figure 14D:
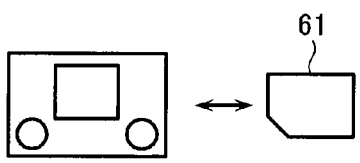
Figure 14I:
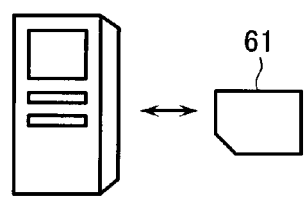
Figure 14E:
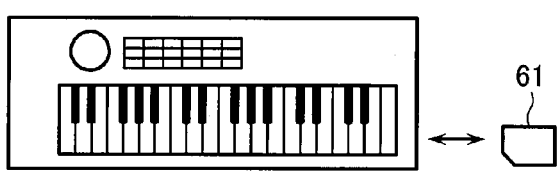
Figure 14J:
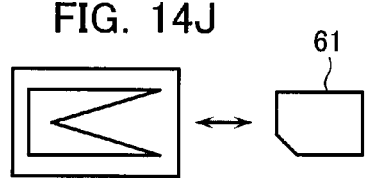

FIG. 13 shows a basic arrangement of the digital still camera. Light from an object is converged by a lens 103 and input to an image pickup device 104. The image pickup device 104 is, for example, a CMOS sensor and photoelectrically converts the input light to output, for example, an analog signal. This analog signal is amplified by an analog amplifier (AMP), and converted into a digital signal by an A/D converter (A/D). The converted signal is input to a camera signal processing circuit 105 where the signal is subjected to automatic exposure control (AE), automatic white balance control (AWB), color separation, and the like, and converted into a luminance signal and color difference signals.

To monitor the image, the output signal from the camera processing circuit 105 is input to a video signal processing circuit 106 and converted into a video signal. The system of the video signal is, e.g., NTSC (National Television System Committee). The video signal is input to a display 108 attached to the digital still camera 101 via a display signal processing circuit 107. The display 108 is, e.g., a liquid crystal monitor.

The video signal is supplied to a video output terminal 110 via a video driver 109. An image picked up by the digital still camera 101 can be output to an image apparatus such as a television set via the video output terminal 110. This allows the pickup image to be displayed on an image apparatus other than the display 108. A microcomputer 111 controls the image pickup device 104, analog amplifier (AMP), A/D converter (A/D), and camera signal processing circuit 105.

To capture an image, an operator presses an operation button such as a shutter button 112. In response to this, the microcomputer 111 controls a memory controller 113 to write the output signal from the camera signal processing circuit 105 into a video memory 114 as a flame image. The frame image written in the video memory 114 is compressed on the basis of a predetermined compression format by a compressing/stretching circuit 115. The compressed image is recorded, via a card interface 116, on the memory card 61 inserted in the card slot.

To reproduce a recorded image, an image recorded on the memory card 61 is read out via the card interface 116, stretched by the compressing/stretching circuit 115, and written into the video memory 114. The written image is input to the video signal processing circuit 106 and displayed on the display 108 or another image apparatus in the same manner as when the image is monitored.

In this arrangement, mounted on the circuit board 100 are the card slot 102, image pickup device 104, analog amplifier (AMP), A/D converter (A/D), camera signal processing circuit 105, video signal processing circuit 106, display signal processing circuit 107, video driver 109, microcomputer 111, memory controller 113, video memory 114, compressing/stretching circuit 115, and card interface 116.

The card slot 102 need not be mounted on the circuit board 100, and can also be connected to the circuit board 100 by a connector cable or the like.

A power circuit 117 is also mounted on the circuit board 100. The power circuit 117 receives power from an external power source or battery and generates an internal power source voltage used inside the digital still camera 101. For example, a DC-DC converter can be used as the power circuit 117. The internal power source voltage is supplied to the respective circuits described above, and to a strobe 118 and the display 108.

As described above, the electric card according to this embodiment can be used in portable electric devices such as the digital still camera explained above. However, the electric card can also be used in various apparatus such as shown in FIGS. 14A to 14J, as well as in portable electric devices. That is, the electric card can also be used in a video camera shown in FIG. 14A, a television set shown in FIG. 14B, an audio apparatus shown in FIG. 14C, a game apparatus shown in FIG. 14D, an electric musical instrument shown in FIG. 14E, a cell phone shown in FIG. 14F, a personal computer shown in FIG. 14G, a personal digital assistant (PDA) shown in FIG. 14H, a voice recorder shown in FIG. 14I, and a PC card shown in FIG. 14.

This invention is not limited to the above-described embodiment. It will be understood by those skilled in the art that various changes in form and detail may be made without departing from the spirit, scope, and teaching of the invention.

What is claimed is:

1. A memory system with a semiconductor memory device, in which a physical block of n-bits serves as an erase unit, wherein
    the address management of the memory device is performed by a logical block with m-bits, "m" being larger than "n" and expressed by a power of two, and wherein
    an n-bit portion continued from a head address in the logical block is defined as a first management unit corresponding to one physical block of the memory device, and a number of remaining fraction portions each defined as a second management unit are gathered so as to correspond to another physical block of the memory device.

2. The memory system according to claim 1, wherein
    the memory device is an electrically rewritable and non-volatile memory device, which stores data of 3-bits/cell.

3. The memory system according to claim 2, wherein
    the memory device is a flash memory, in which NAND strings are arranged therein, each NAND string including multiple memory cells connected in series.

4. The memory system according to claim 2, wherein
the physical block of the memory device and the logical block are 3MB and 4MB, respectively, and wherein
a 3MB portion continued from the head address in the logical block is defined as the first management unit corresponding to one physical block of the memory device, and three 1MB fraction portions each defined as the second management unit are gathered so as to correspond to one physical block of the memory device.

5. The memory system according to claim 1, wherein the memory system is a memory card having a memory controller equipped together with the memory device.

6. A method of controlling a semiconductor memory device, in which a physical block of n-bits serves as an erase unit, wherein
the address management of the memory device is performed by a logical block with m-bits, "m" being larger than "n" and expressed by a power of two, and wherein
an n-bit portion continued from a head address in the logical block is defined as a first management unit corresponding to one physical block of the memory device, and a number of remaining fraction portions each defined as a second management unit are gathered so as to correspond to another physical block of the memory device.

7. The method according to claim 6, wherein
the physical block of the memory device and the logical block are 3MB and 4MB, respectively, and wherein
a 3MB portion continued from the head address in the logical block is defined as the first management unit corresponding to one physical block of the memory device, and three 1MB fraction portions each defined as the second management unit are gathered so as to correspond to one physical block of the memory device.

8. The method according to claim 7, wherein
renewal data write operation continuously performed for at least three, first to third, logical blocks comprises: (1) writing the head 3MB data in a renewed write data in the first logical block into a first physical block; (2) writing the remaining 1MB data in the first logical block to a second physical block; (3) writing the head 3MB data in a renewed write data in the second logical block into a third physical block; (4) writing the remaining 1MB data in the second logical block to the second physical block; (5) writing the head 3MB data in a renewed write data in the third logical block into a fourth physical block; (6) writing the remaining 1MB data in the third logical block to the second physical block; and erasing physical blocks, in which old data of the three logical blocks are written.

9. The method according to claim 7, wherein
a memory controller equipped together with the memory device has a logical/physical address conversion table.

10. A memory system with a semiconductor memory device, in which a physical block of n-bits serves as an erase unit, wherein
the address management of the memory device is performed by a logical block with m-bits, "m" being larger than "n", and expressed by a power of two wherein
an n-bit portion continued from certain address in the logical block is defined as a first management unit corresponding to one physical block of the memory device, and a number of remaining fraction portions expressed by n/(m−n) and each defined as a second management unit are gathered so as to correspond to another physical block of the memory device.

11. The memory system according to claim 10, wherein
the memory device is an electrically rewritable and non-volatile memory device, which stores data of 3-bits/cell.

12. The memory system according to claim 11, wherein
the memory device is a flash memory, in which NAND strings are arranged therein, each NAND string including multiple memory cells connected in series.

13. The memory system according to claim 11, wherein
the physical block of the memory device and the logical block are 3MB and 4MB, respectively, and wherein
a 3MB portion continued from the head address in the logical block is defined as the first management unit corresponding to one physical block of the memory device, and three 1MB fraction portions each defined as the second management unit are gathered so as to correspond to one physical block of the memory device.

14. The memory system according to claim 10, wherein
the memory system is a memory card having a memory controller equipped together with the memory device.

* * * * *